US012614946B2

(12) United States Patent
Herrada et al.

(10) Patent No.: US 12,614,946 B2
(45) Date of Patent: Apr. 28, 2026

(54) COIL FOR STATOR OF ELECTRIC MOTOR, STATOR AND MANUFACTURING PROCESS

(71) Applicant: VALEO SYSTÈMES D'ESSUYAGE, Le Mesnil Saint Denis (FR)

(72) Inventors: Jose Luis Herrada, Le Mesnil Saint Denis (FR); Gilles Neron, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 229 days.

(21) Appl. No.: 18/697,327

(22) PCT Filed: Sep. 30, 2022

(86) PCT No.: PCT/EP2022/077320
§ 371 (c)(1),
(2) Date: Mar. 29, 2024

(87) PCT Pub. No.: WO2023/052605
PCT Pub. Date: Apr. 6, 2023

(65) Prior Publication Data
US 2024/0291340 A1 Aug. 29, 2024

(30) Foreign Application Priority Data
Sep. 30, 2021 (FR) ...................................... 2110375

(51) Int. Cl.
*H02K 3/52* (2006.01)

(52) U.S. Cl.
CPC ......... *H02K 3/522* (2013.01); *H02K 2203/12* (2013.01)

(58) Field of Classification Search
CPC ... H02K 15/095; H02K 3/522; H02K 2203/12
See application file for complete search history.

(56) References Cited

U.S. PATENT DOCUMENTS

| | | | |
|---|---|---|---|
| 2005/0029891 A1* | 2/2005 | Okada ..................... | H02K 3/522 |
| | | | 310/194 |
| 2012/0025662 A1* | 2/2012 | Takahashi .............. | H02K 3/522 |
| | | | 310/215 |

(Continued)

FOREIGN PATENT DOCUMENTS

| | | |
|---|---|---|
| CN | 212969192 U | 4/2021 |
| DE | 102007062059 A1 | 6/2009 |
| WO | 2020100196 A1 | 5/2020 |

OTHER PUBLICATIONS

International Search Report issued in corresponding International Patent Application No. PCT/EP2022/077320, mailed on Sep. 30, 2022 (5 pages).

(Continued)

*Primary Examiner* — Oluseye Iwarere
*Assistant Examiner* — Masoud Vaziri
(74) *Attorney, Agent, or Firm* — Osha Bergman Watanabe & Burton LLP

(57) ABSTRACT

A coil of a stator for an electric motor is disclosed. The coil includes a bobbin which forms a tooth of the stator. The bobbin includes a tubular central shaft with a plurality of channels formed along its perimeter between a first end of the bobbin that is configured to face towards the middle of the stator. The bobbin also includes a first retaining flange situated on the first end of the central shaft, a second retaining flange situated on the second end of the central shaft, and a winding wire configured to be wound in the form of turns around the bobbin. The ends of the winding wire are positioned at the first end of the bobbin so as to enable electrical connections toward the center of the stator. The bobbin includes a material cutout extending between the first and second ends of the bobbin.

15 Claims, 14 Drawing Sheets

(56)  References Cited

U.S. PATENT DOCUMENTS

| | | | | |
|---|---|---|---|---|
| 2012/0286619 A1* | 11/2012 | Tsuiki | .................... | H02K 3/522 |
| | | | | 310/215 |
| 2014/0339935 A1* | 11/2014 | Harada | .................... | H02K 3/50 |
| | | | | 310/71 |
| 2014/0363320 A1* | 12/2014 | Hayakawa | ............... | H02K 3/52 |
| | | | | 417/420 |

OTHER PUBLICATIONS

Written Opinion issued in corresponding International Patent Application No. PCT/EP2022/077320, mailed on Sep. 30, 2022 (6 pages).

* cited by examiner

COIL FOR STATOR OF ELECTRIC MOTOR, STATOR AND MANUFACTURING PROCESS

The present invention relates to the field of electric motors, notably electric motors intended to be fitted to electric bicycles.

Electric bicycles are becoming increasingly popular because of the ease of travel they afford, while still having lower energy consumption, low environmental impact, and low cost price.

However, use in an electric bicycle involves various constraints. In particular, it is necessary to provide a high torque and a low rotational speed so as to allow effective assistance while at the same time being compatible with the cyclist's pedaling rate.

Furthermore, the siting of the electric motor on the bicycle, generally in the region of the bottom bracket assembly of the bicycle, runs into constraints on size so as to allow the electric motor to be installed without compromising on other features of the bicycle.

In order to address these constraints, it is therefore necessary to minimize the bulk of the electric motor and, in particular, the bulk of the coils of the stator. One way of limiting this bulk is to use a winding referred to as a trapezoidal winding, in which the number of layers of turns varies between the two ends of the coil, and to establish electrical connections for the coils on the side of the coils that faces toward the interior of the stator. However, it is difficult to produce a trapezoidal winding with ends which are situated on the side of the coil intended to face toward the center of the stator so as to ensure the turns are held in place while still limiting the bulk of the coil.

It is therefore necessary to find a solution for obtaining coils with a trapezoidal winding that make it possible to obtain a stator that also has reduced bulk.

To this end, the invention therefore relates to a coil of a stator for an electric motor, comprising:

a bobbin which forms a tooth of the stator, comprising:

a tubular central shaft comprising a plurality of channels disposed along its perimeter between a first end of the bobbin that is intended to face toward the center of the stator and a second end of the bobbin that is intended to face toward the outside of the stator, the channels being intended to receive a turn of a winding wire wound around the bobbin, a first retaining flange situated on the first end of the central shaft, a second retaining flange situated on the second end of the central shaft, a winding wire configured to be wound in the form of turns around the bobbin, the ends of the winding wire being positioned at the first end of the bobbin so as to enable electrical connections toward the center of the stator, wherein the bobbin comprises a material cutout extending between the first end and the second end of the bobbin, said material cutout being configured to receive the winding wire and allow the passage of the winding wire between the first end and the second end of the bobbin.

The presence of an axial cutout extending between the first and the second end of the bobbin makes it possible to position the first commutator associated with a first end of the bobbin and to start the winding of the winding wire in a channel situated at the second end of the bobbin without creating an overthickness in the winding, thereby making it possible to position the two commutators on the same side of the bobbin and produce a trapezoidal winding so as to reduce the bulk of the coil while at the same time limiting the risk of a short circuit with an adjacent coil.

According to another aspect of the present invention, the material cutout forms an axial groove extending through the channels.

According to another aspect of the present invention, the depth of the material cutout is between 0.8 and 1.2 times the diameter of the winding wire, thereby making it possible to avoid creating an overthickness of the winding.

According to another aspect of the present invention, the coil also comprises a retaining stud disposed at the second end of the bobbin and configured to orient the winding wire coming from the material cutout toward a starting channel for the winding of the winding wire. The retaining stud makes it possible to ensure the correct positioning of the winding wire and to limit the risk of the winding wire shifting, which can lead to a malfunction of the electric motor.

According to another aspect of the present invention, the coil also comprises a first commutator configured to receive the first end of the winding wire and a second commutator configured to receive the second end of the winding wire.

According to another aspect of the present invention, the first and the second commutators are in one piece with the bobbin.

According to another aspect of the present invention, the channels are inclined in relation to a plane normal to the shaft of the bobbin, the width and the inclination of the channels being determined such that turns of the winding that are disposed in two adjacent channels are adjacent and the successive turns form a helical winding around the central shaft.

According to another aspect of the present invention, the central shaft of the bobbin has a rectangular cross section.

According to another aspect of the present invention, the bobbin forms a separate tooth of the stator that is configured to be positioned on a central module of the stator after the winding has been made.

Having separate teeth for which the winding is wound before they are positioned on the central module of the stator makes it possible to maximize the ratio between the amount of winding and the bulk (the coils can be positioned very close to one another).

According to another aspect of the present invention, the coil comprises an inner portion intended to receive a first number of layers of turns and an outer portion intended to receive a second number of layers of turns greater than the first number so as to form a trapezoidal winding, and at least one of the turns of the last layer of the inner portion is made after the turns of the last layer of the outer portion in order to hold the various turns of the winding in place.

The use of a trapezoidal winding makes it possible to reduce the bulk of the winding and thus of the stator, and winding a turn of the inner portion after the turns of the outer portion makes it possible to reduce the angle formed by the winding wire after the turns of the last layer of the outer portion have been wound. The winding wire is thus held in place better and the risk of the winding wire shifting, which can lead to a malfunction of the electric motor, is thus reduced.

The present invention also relates to a stator for an electric motor, comprising a plurality of coils as described above.

According to another aspect of the present invention, the coils are connected in a star configuration.

The present invention also relates to an electric motor comprising a stator as described above, wherein said electric motor is a three-phase brushless motor.

The present invention also relates to a method for manufacturing a coil of a stator for an electric motor, comprising a bobbin on which is formed a plurality of channels intended to receive the turns of a winding wire and disposed along the perimeter of a central shaft of the bobbin between a first end of the central shaft intended to face toward the interior of the stator and a second end of the central shaft intended to face toward the outside of the stator, the bobbin also comprising a material cutout forming a groove for guiding a winding wire between the first end and the second end of the central shaft, said method comprising a step of positioning the winding wire in the guide groove before a step of winding the winding wire around the bobbin. The use of the guide groove makes it possible to start the winding of the winding at the opposite end to the commutator, such that the two commutators can be positioned on the same side of the bobbin, thereby making it possible to reduce the bulk of the coil.

According to another aspect of the present invention, the step of winding the winding wire is terminated at one end of the bobbin and the second end of the winding wire is attached at the first end of the bobbin.

Further features and advantages of the invention will become more clearly apparent from reading the following description, which is given by way of illustrative and non-limiting example, and the appended drawings, in which.

In these figures, elements that are identical bear the same reference signs.

The following embodiments are examples. Although the description refers to one or more embodiments, this does not necessarily mean that each reference relates to the same embodiment, or that the features apply only to a single embodiment. Individual features of various embodiments may also be combined or interchanged to create other embodiments.

In the present description, certain elements or parameters may be indexed, for example first element or second element and also first parameter and second parameter or first criterion and second criterion, etc. In this case, this is simply indexing to differentiate and designate elements or parameters or criteria that are similar but not identical. This indexing does not imply priority being given to one element, parameter or criterion over another and such designations may be interchanged easily without departing from the scope of the present description. Neither does this indexing imply any chronological order for example in assessing any given criterion.

Figure 1:
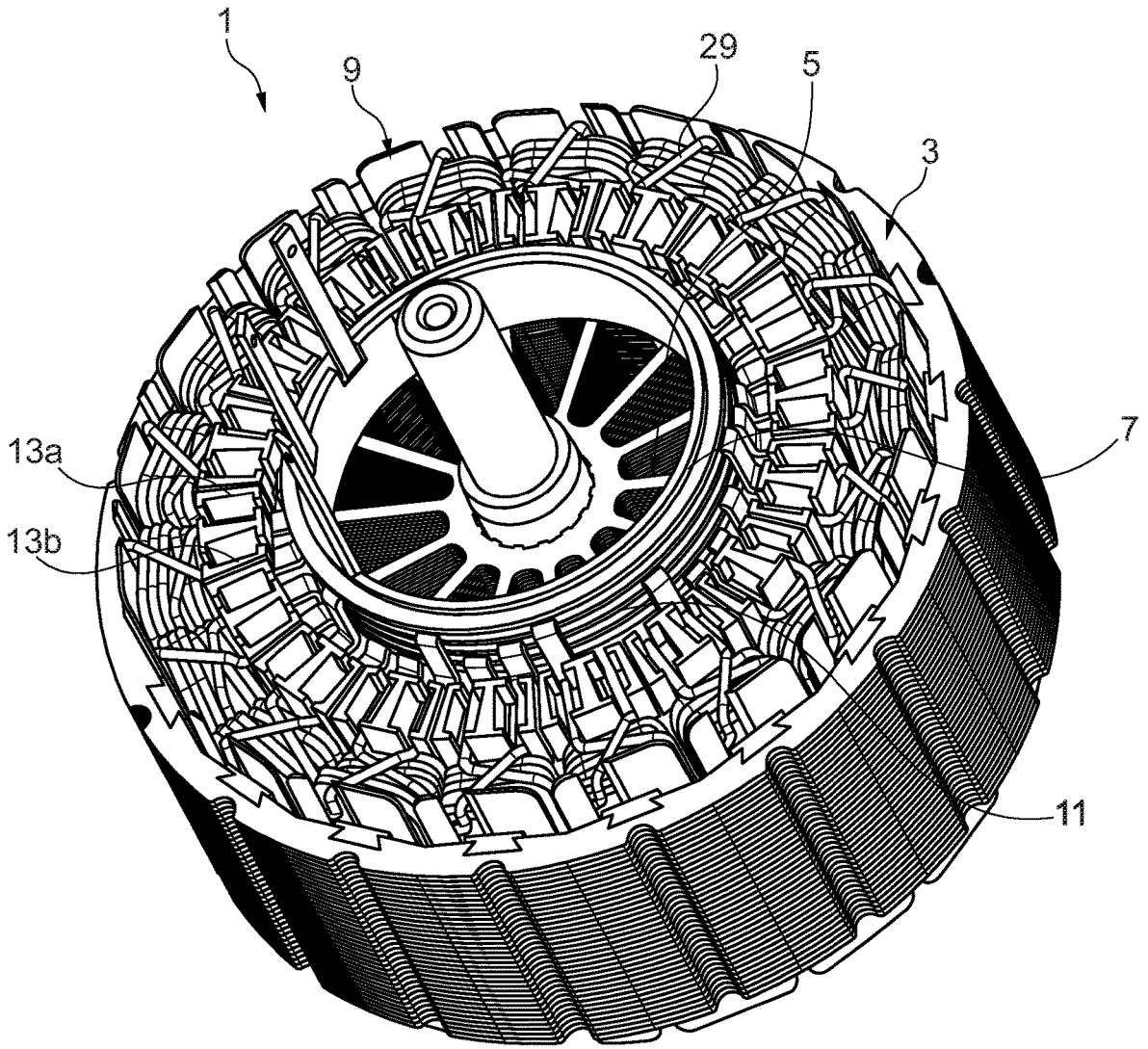
FIG. 1 shows a schematic perspective view of part of an electric motor.

FIG. 1 shows a diagram of part of an electric motor 1 comprising a stator 3 and a rotor 5. The electric motor 1 is, for example, a three-phase brushless electric motor, but the present invention is not limited to this type of electric motor 1. Such an electric motor 1 is particularly suitable for being disposed in an electric bicycle, but the present invention is not limited to this application.

The stator 3 comprises a central module 7 and a plurality of teeth formed by coils 9 and disposed around the central module 7. The coils 9 form, for example, separate teeth configured to be fastened to the central module 7. The central module 7 comprises, for example, connecting frames 11 configured to connect the various coils 9 according to a predefined electrical diagram, for example a star or delta configuration. The connecting frames 11 comprise, for example, radially extending connecting tabs and the coils 9 comprise, for example, complementing commutators 13a and 13b. The commutators 13a and 13b are configured to receive the ends of the winding wires 29 and to be positioned on the connecting tabs so as to ensure an electrical connection between the ends of the winding wires 29 and the connecting frames 11.

Figure 2:
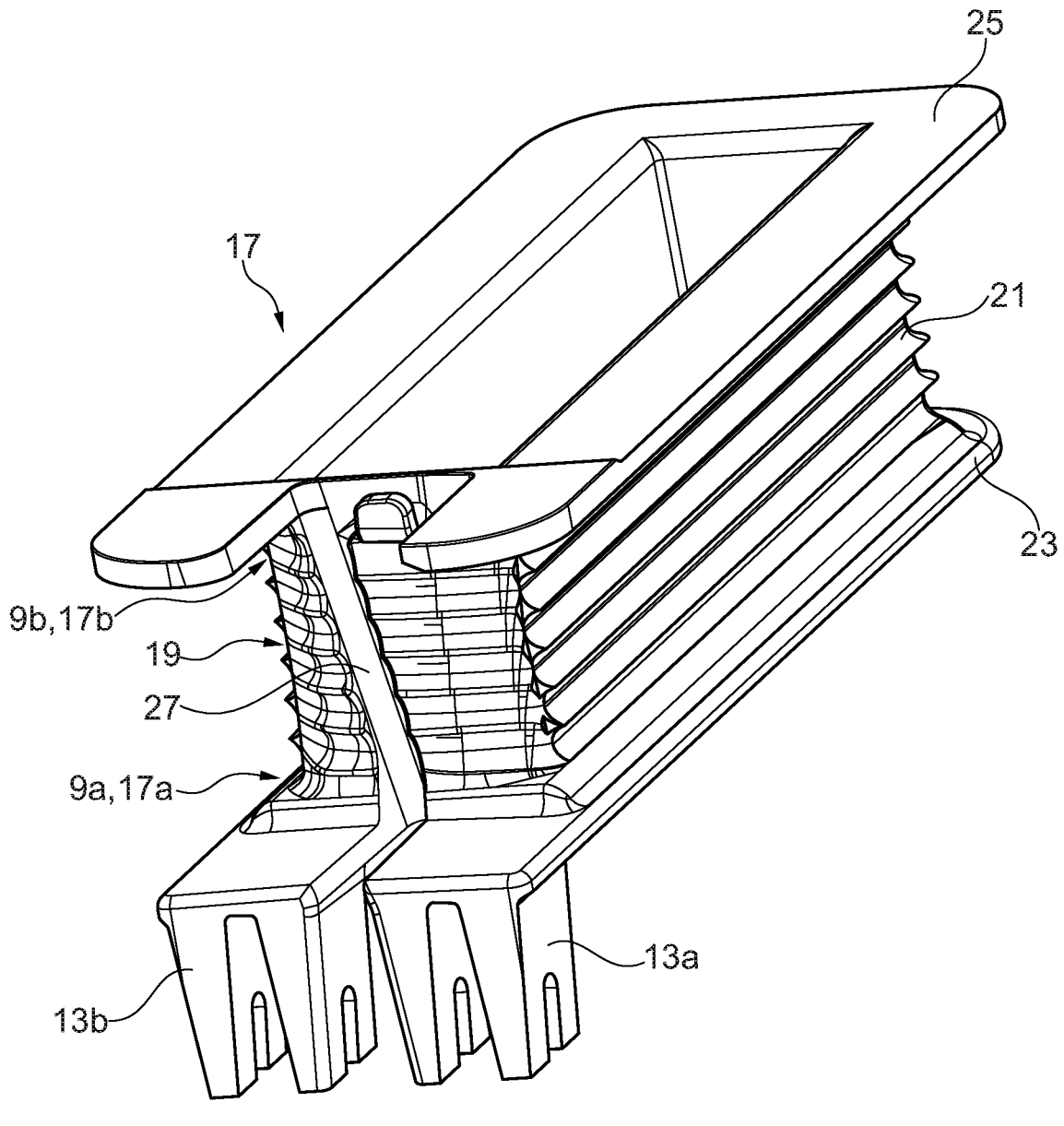
FIG. 2 shows a first schematic perspective view of a bobbin for a coil of a stator.

FIG. 2 shows a schematic perspective view of a bobbin 17 for a coil 9. The bobbin 17 forms the support on which the winding wire 29 is wound in order to form the coil 9. The bobbin 17 comprises a tubular central shaft 19. In the present case, the cross section of the central shaft 19 is rectangular, but other cross-sectional shapes may also be used. The central shaft 19 comprises a plurality of channels 21 disposed along its perimeter and configured to receive turns of winding wire 29 so as to make it possible to hold them in place along the central axis 19. The channels 21 extend along a direction substantially perpendicular to the axial direction of the central shaft 19. However, the channels 21 may be at an angle in relation to the direction perpendicular to the axial direction so as to make it possible to wind the turns in a helix along the central shaft 19. The width of the channels 21 is determined such that two consecutive turns of the winding are adjacent. The channels 21 are formed between a first end 17a of the bobbin 17 that also corresponds to a first end 9a of the coil 9 and a second end 17b of the bobbin 17 that also corresponds to a second end 9b of the coil 9. The first end 17a of the bobbin 17 is intended to face toward the center of the stator 3 and comprises a first retaining flange 23 for retaining the winding wire 29. The second end 17b of the bobbin 17 is intended to face toward the outside of the stator 3 and comprises a second retaining flange 25 for retaining the winding wire 29.

The bobbin 17 may also comprise a first commutator 13a configured to receive a first end of the winding wire 29 that corresponds, for example, to the initial end of the winding wire 29, that is to say the end connected to a turn of the first layer (i.e. the layer in contact with the channels 21 of the bobbin 17) and a second commutator 13b configured to receive a second end of the winding wire 29 that corresponds, for example, to the final end of the winding wire 29, that is to say the end connected to a turn of the last layer (i.e. the peripheral layer).

In the present case, the first commutator 13*a* and the second commutator 13*b* are situated on the inner side of the bobbin 17, that is to say the side of the bobbin 17 that is configured to face toward the interior of the stator 3 in the mounted state of the stator 3. The first commutator 13*a* and the second commutator 13*b* are, for example, fastened to the first retaining flange 23 and are, for example, in one piece with the rest of the bobbin 17.

Figure 3:
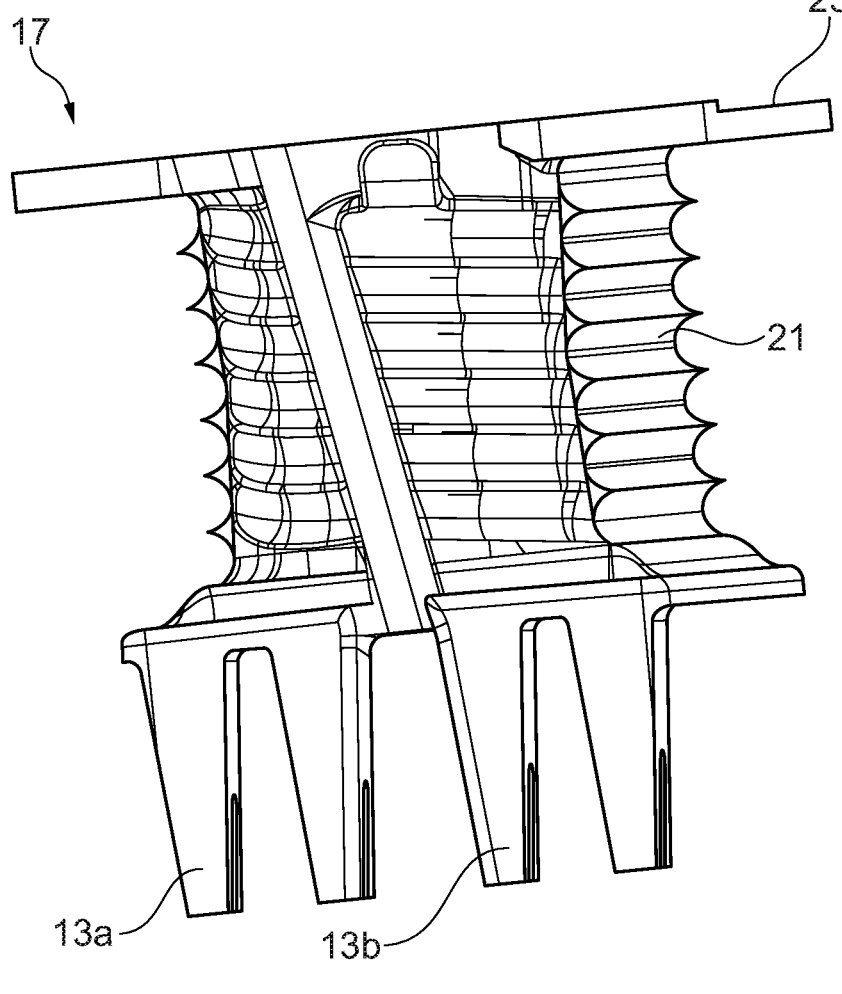
FIG. 3 shows a second schematic perspective view of a bobbin for a coil of a stator.
Figure 4:
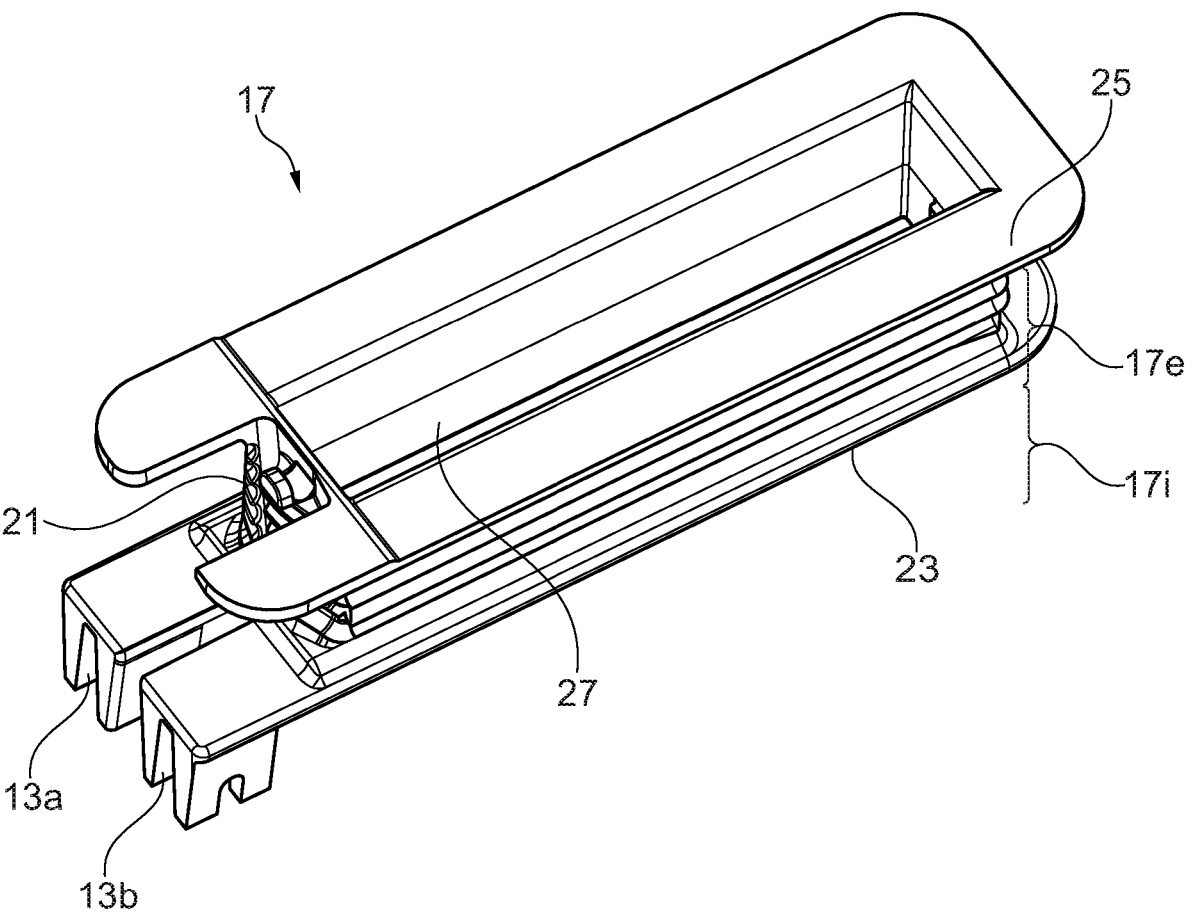
FIG. 4 shows a third schematic perspective view of a bobbin for a coil of a stator.

According to a particular embodiment of the bobbin 17 shown in FIGS. 2 to 4, the bobbin 17 comprises a material cutout 27 extending in a substantially axial direction of the bobbin 17, that is to say in a direction substantially perpendicular to the direction of the channels 21. The material cutout 27 is configured to receive the winding wire 29. The material cutout 27 is configured to extend the first end 17*a* of the bobbin, notably from the first commutator 13*a* to the second end 17*b* of the bobbin 17, in order to form an axial groove enabling the passage of the winding wire 29 from the first end 17*a* to the second end 17*b* of the bobbin 17 before the winding of the winding wire 29 starts. Such a passage of the winding wire in an axial groove makes it possible to position the first commutator 13*a* at the first end 17*a* of the bobbin 17 and to start winding the winding in a channel 21 situated at the second end 17*b* of the bobbin 17 without increasing the bulk of the coil 9. The width of the material cutout 27 is, for example, between 1 and 1.2 times the diameter of the winding wire 29 and the depth of the material cutout 27 is, for example, between 0.6 and 1.2 times the diameter of the winding wire 29.

The bobbin 17 may also comprise a guide stud 31 formed at the second end 17*b* of the bobbin 17, in the vicinity of the end of the material cutout 27, so as to make it possible to guide the winding wire 29 from the material cutout 27 to the starting channel for the winding. Specifically, since the material cutout 27 extends in a substantially axial direction of the bobbin 17 and the channels 21 extend along a direction substantially perpendicular to the axial direction of the bobbin 17, it is necessary to guide the winding wire 29 between the material cutout 27 and the starting channel in order to avoid shifting of the winding wire 29, which could then leave the material cutout 27 or the starting channel 21, this possibly leading to poor winding of the winding wire 29 or even to a malfunction of the coil 9. The guiding stud 31 may have the shape of a hook on which the winding wire 29 is wound. The end of the hook makes it possible to retain the winding wire 29 against the central shaft 19 of the bobbin 17 and the base of the hook makes it possible to retain the winding wire in an axial direction. As a result, the winding wire 29 is configured to extend from the first commutator 13*a* in the material cutout 27 to the retaining stud 31 around which it is wound so as to be positioned in the starting channel.

The coil 9 therefore also comprises a winding wire 29 configured to be wound around the bobbin 17 so as to form the winding. Various types of winding can be produced, notably a trapezoidal winding, in which the number of layers of turns is not the same over all the axial length of the bobbin 17. However, the material cutout 27 may be used for other types of winding, in which the winding wire 29 must be transferred from a first end 17*a* to a second end 17*b* of the bobbin 17 before it is wound.

In the case of a trapezoidal winding, the bobbin 17 and therefore the coil 9 comprise, for example, an inner portion 9*i*, 17*i* intended to receive a first number of layers of turns, for example two layers, and an outer portion 9*e*, 17*e* intended to receive a second number of layers of turns greater than the first number, for example three layers. It is also possible to design a bobbin comprising more than two parts, for example three parts, each having a different number of layers of turns. Furthermore, since the first commutator 13*a* and the second commutator 13*b*, which are intended to receive the ends 29*a* and 29*b* of the winding wire 29, are situated at the first end 17*a* of the bobbin 17, that is to say the end intended to face toward the center of the stator 3 in the mounted state, it is necessary to finish the winding at the first end 17*a* of the bobbin 17.

In order to obtain such a winding, the winding of the winding wire 29 is started in a channel 21 corresponding to the outer channel at the second end 17*b* of the bobbin 17.

Figure 5:
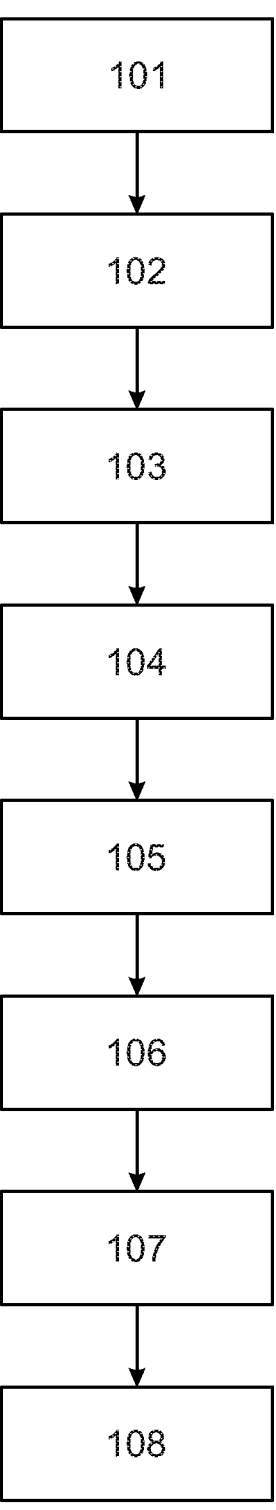
FIG. 5 shows a flow diagram of the steps of a method for manufacturing a coil according to the present invention.

The present invention also relates to a method for manufacturing a coil as described above. FIG. 5 shows a flow diagram of the steps of the manufacturing method. The first step 101 concerns positioning the first end 29*a* of the winding wire 29 in the first commutator 13*a*.

Figure 6:
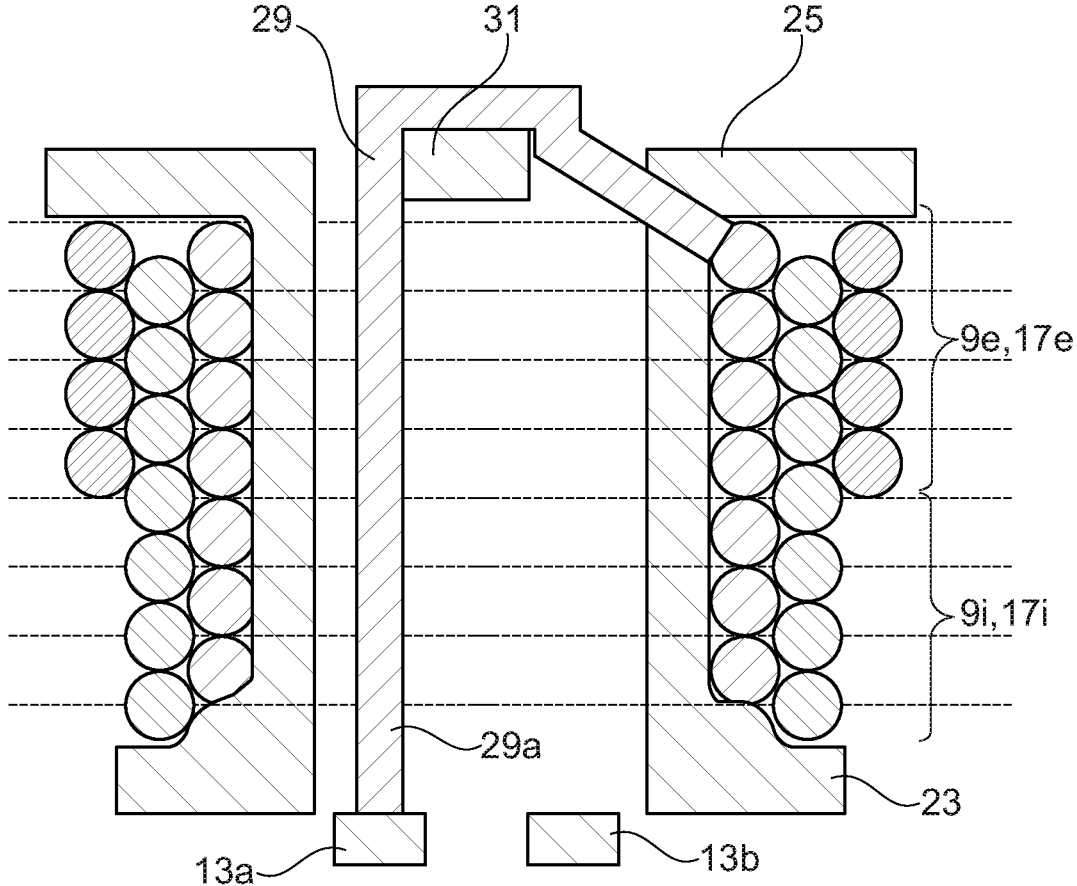
FIG. 6 shows a schematic view, in section, of a coil during a first winding step.

The second step 102 concerns positioning the winding wire 29 in the material cutout 27. If the bobbin 17 comprises a retaining stud 31, step 102 also includes positioning the winding wire 29 around the retaining stud 31 as far as the starting channel, as shown in FIG. 6. In FIG. 6, the circles represent the position of the various turns at the end of the winding and the dashed lines represent the position of the channels 21.

In the present case, the bobbin 17 comprises seven channels 21 and the outer part 9*a* of the coil 9 comprises four channels 21. The starting channel corresponds to the first channel (proceeding from the first end 17*a* of the bobbin 17).

Figure 7:
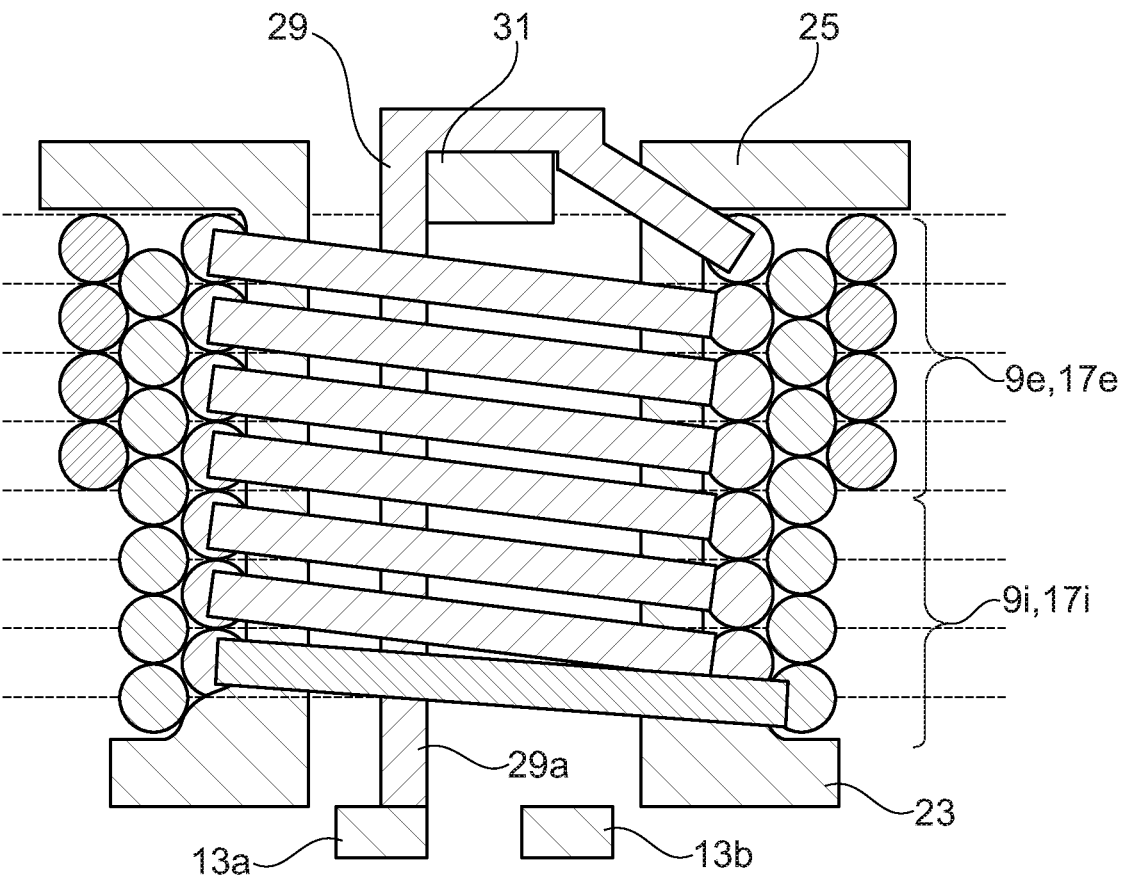
FIG. 7 shows a schematic view, in section, of a coil during a second winding step.

The third step 103 concerns winding the first layer of turns, that is to say the layer of turns in contact with the channels 21 of the bobbin 17. The winding is performed from the starting channel and proceeds toward the first end 17*a* of the bobbin 17 along the adjacent channels 21, as shown in FIG. 7.

Figure 8:
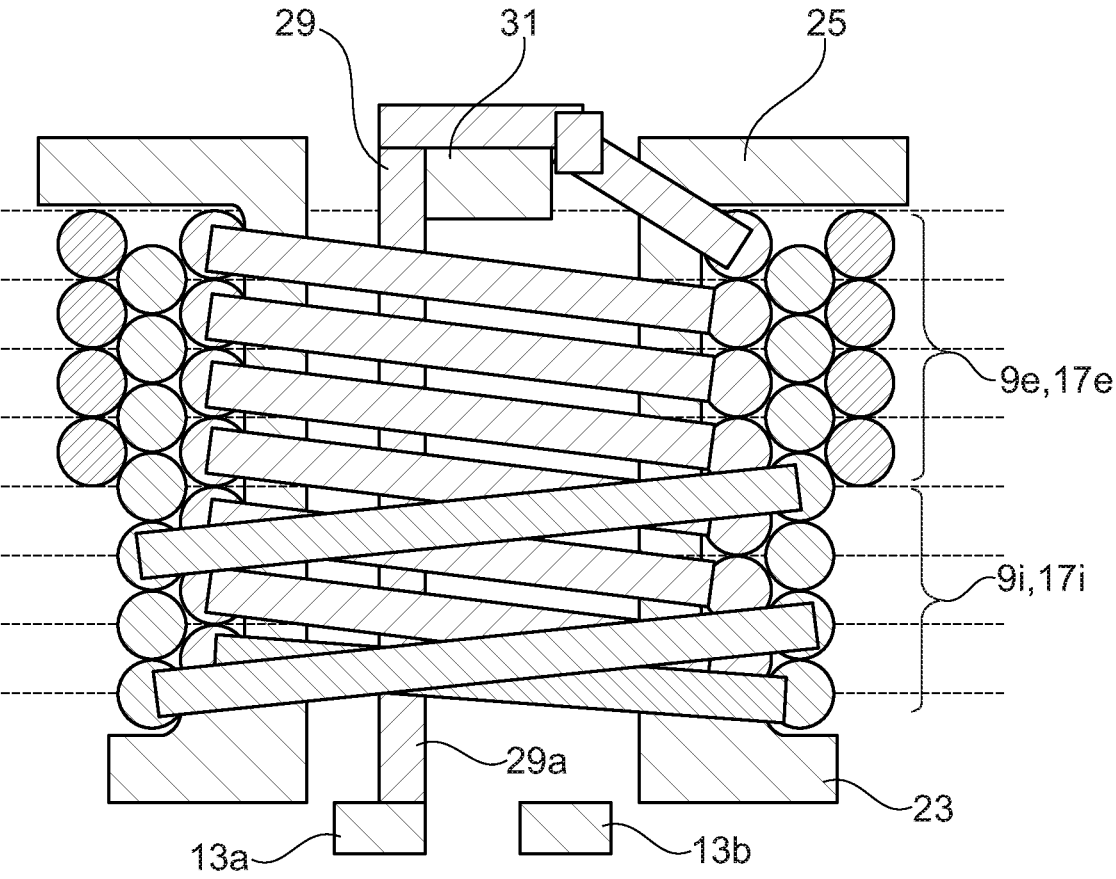
FIG. 8 shows a schematic view, in section, of a coil during a third winding step.

The fourth step 104 concerns winding the second layer of turns of the inner portion 17*i* of the bobbin 17. When the winding reaches the outer channel situated at the first end 17*a* of the bobbin 17, at the end of step 103, the winding starts the second layer of turns of the inner portion 17*i* of the bobbin 17 by moving toward the second end 17*b* of the bobbin 17, the winding being performed on top of the turns formed during step 103. The turns of the second layer are positioned in the pseudo-channel formed at the interface between two adjacent turns of the first layer. In addition, at least one site of a turn, that is to say one of the pseudo-channels, is left free when the turns of the second layer of the inner portion 17*i* are being wound, as shown in FIG. 8. The site left free is, for example, situated in the middle of the inner portion 17*i*. If multiple sites are left free, the sites left free are distributed among the turns of the inner portion 17*i*, for example one site for every two.

Figure 9:
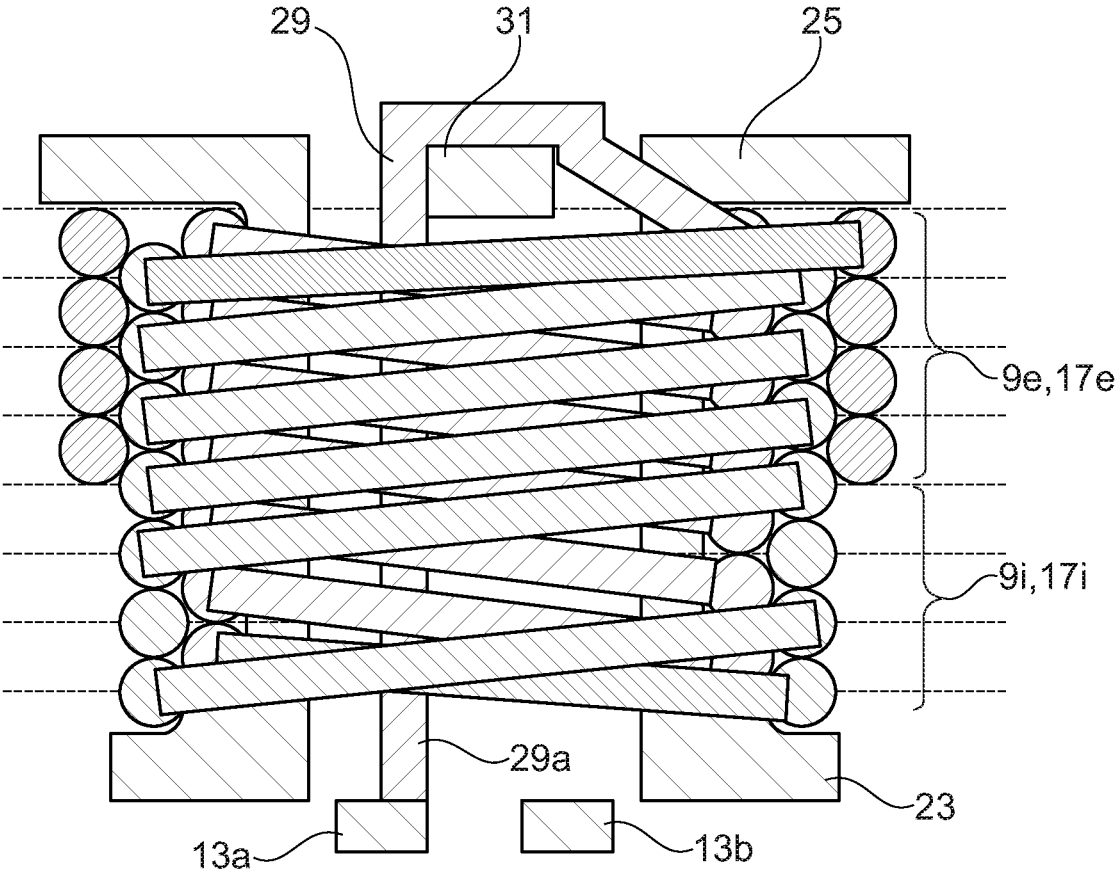
FIG. 9 shows a schematic view, in section, of a coil during a fourth winding step.

The fifth step 105 concerns winding the turns of the second layer of the outer portion 17*e* of the bobbin 17. When the winding reaches the outer portion 17*e* at the end of step 104, the turns are wound as far as the second end 17*b* of the bobbin 17, as shown in FIG. 9.

Figure 10:
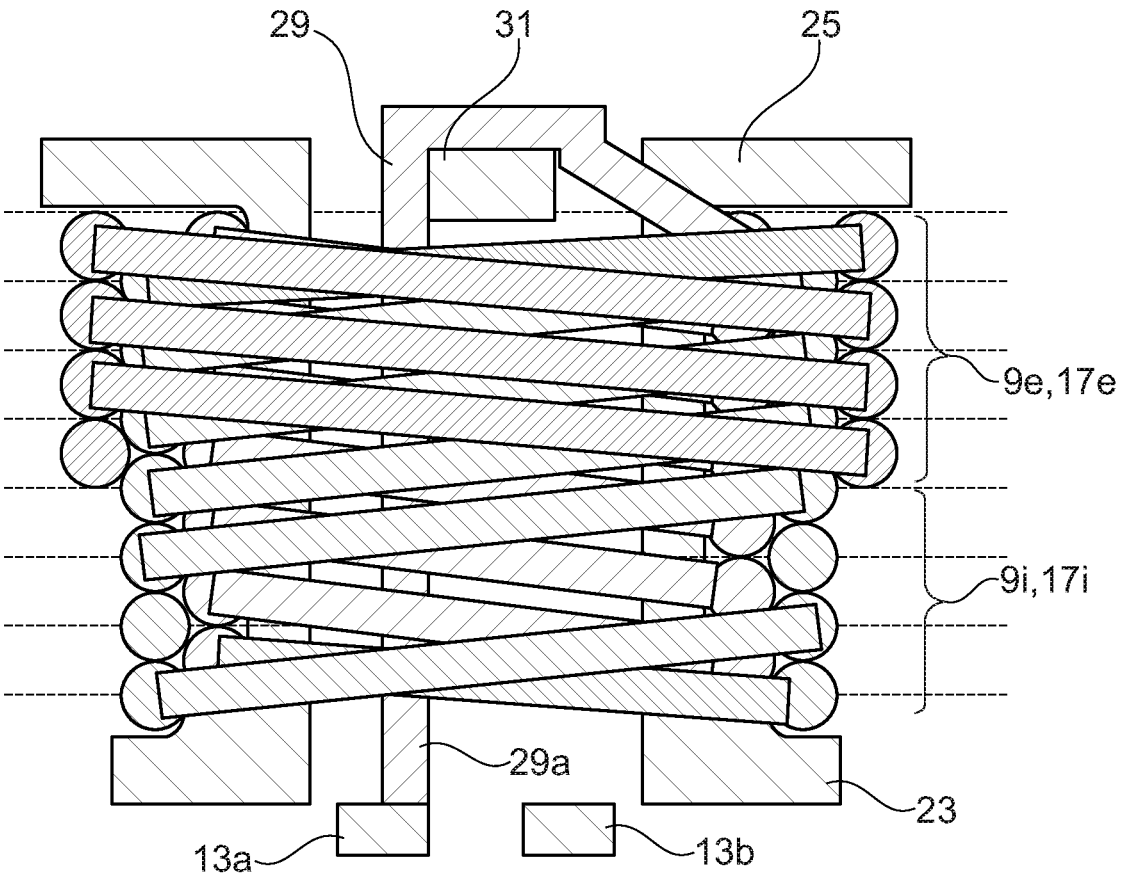
FIG. 10 shows a schematic view, in section, of a coil during a fifth winding step.

The sixth step 106 concerns winding the turns of the third layer of the outer portion 17*e* of the bobbin 17. When the winding reaches the second end 17*b* at the end of step 105, the winding returns to the first end 17*a* so as to form the third layer of turns of the outer portion 17*e*, as shown in FIG. 10.

Figure 11:
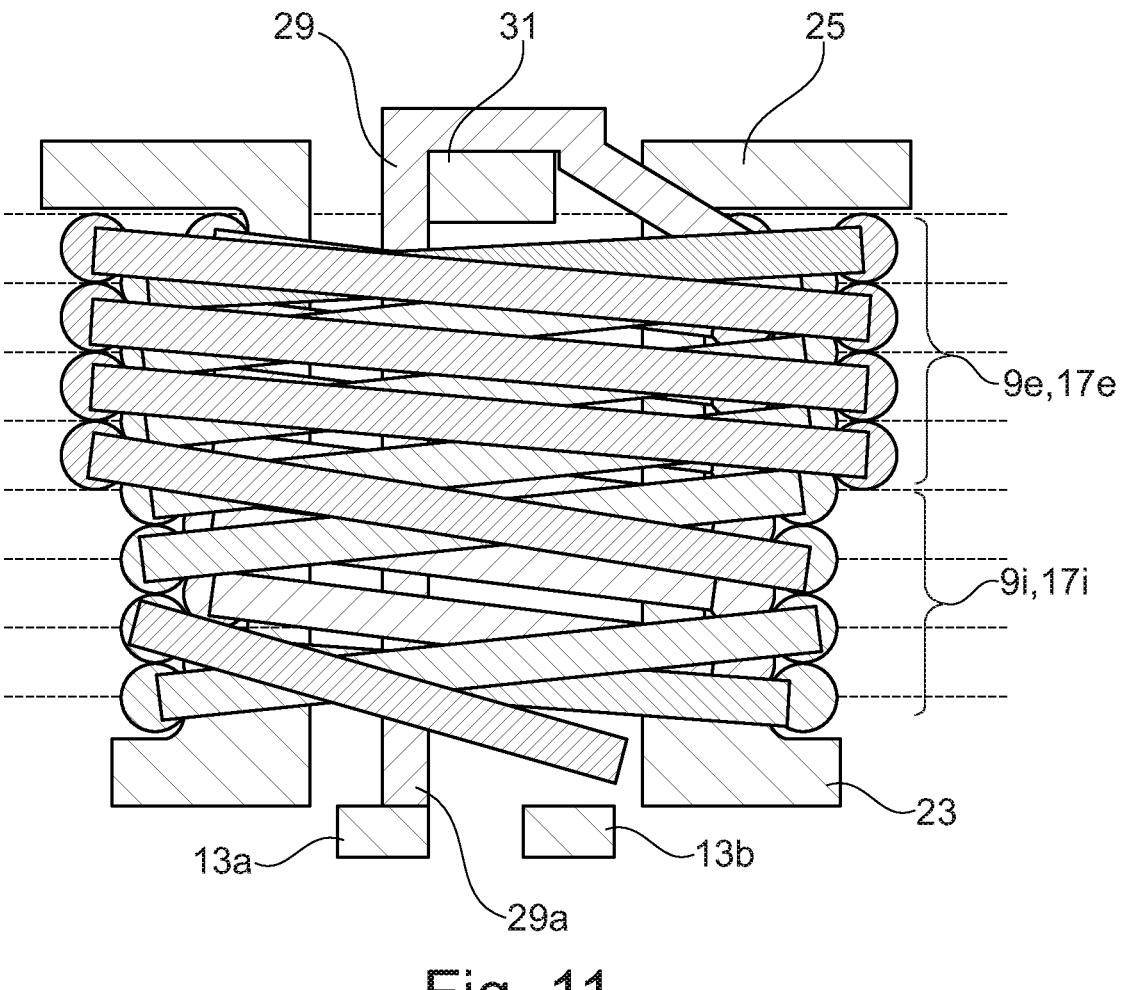
FIG. 11 shows a schematic view, in section, of a coil during a sixth winding step.

The seventh step 107 concerns winding one or more turns in the sites left free in the second layer of the inner portion 17*i* of the bobbin 17 during step 104, as shown in FIG. 11. These turns correspond to turns of the second layer of the inner portion 17*i* but are made after the turns of the third layer of the outer portion 17*e*.

The eighth step 108 concerns positioning the second end 29*b* of the winding wire 29 in the second commutator 13*b*.

Figure 12:
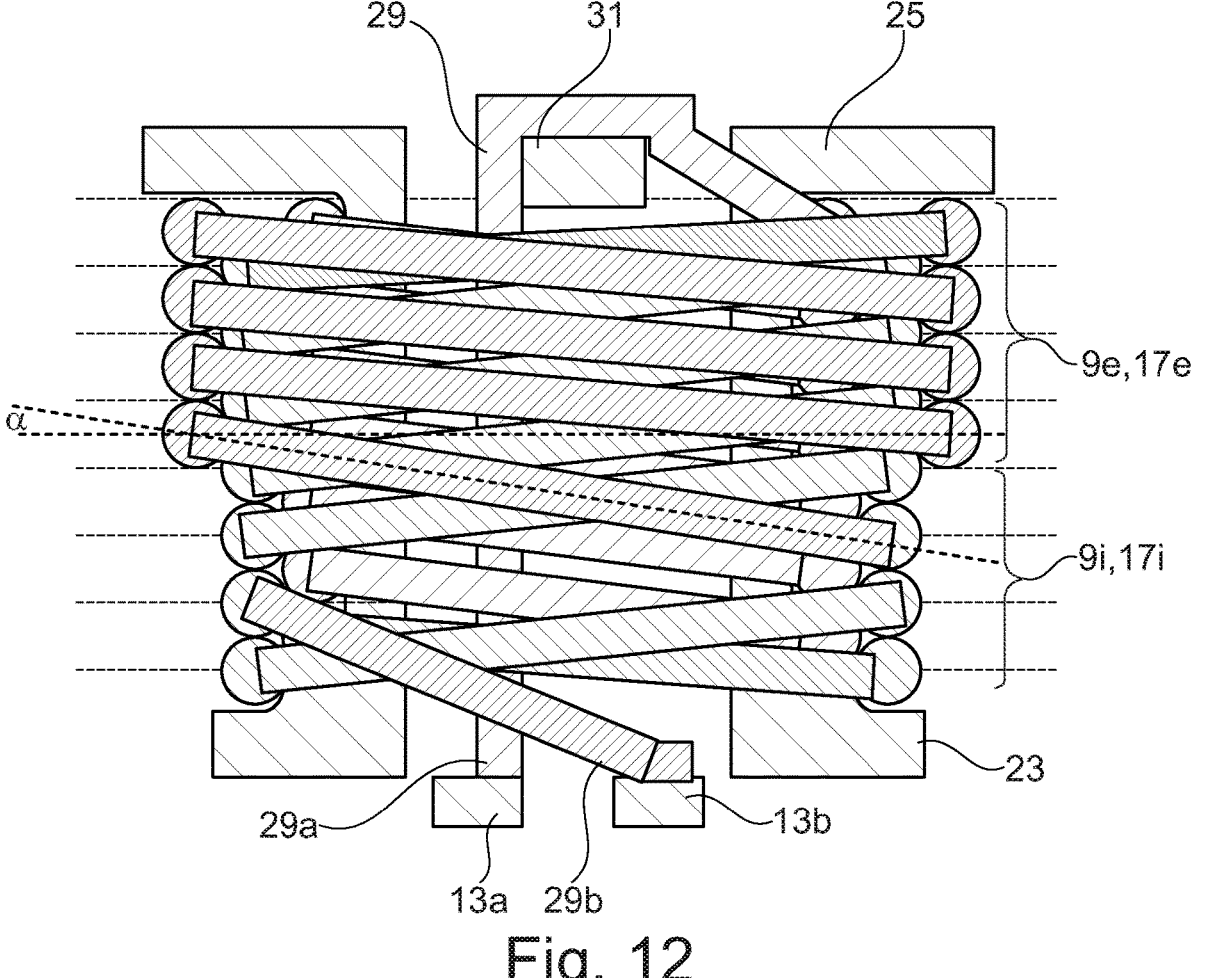
FIG. 12 shows a schematic view, in section, of a coil at the end of the winding.

At the end of the winding, at the end of step 107, the second end 29*b* of the winding wire is attached to the second commutator 13*b*, as shown in FIG. 12. This step 108 may comprise cutting the winding wire 29 so as to form the second end 29*b* of the winding wire 29. The one or more last turns are held in place by the adjacent turns of the second layer of the inner portion 17*i*.

It should be noted that the number of turns per layer and the number of layers may be different from the embodiment presented above, such that the starting channel for the winding can also be the outer channel situated at the first end 17*a* of the bobbin 17. In this case, it is possible for the bobbin 17 to not comprise a material cutout 17 or a retaining stud 31. It is also possible to use solutions other than the material cutout 27 to enable the passage of the winding wire 29 from the first end to the second end of the bobbin 17 before the turns are wound.

In addition, some of the steps of the method may be optional, or additional steps may be added.

Thus, leaving free one or more sites for turns when the turns of the last layer of the inner portion 17*i* of the bobbin 17 are being wound and filling these one or more free sites after the turns of the last layer of the outer portion 17*e* of the bobbin 17 have been formed makes it possible to produce a trapezoidal winding while at the same time ensuring the various turns, in particular the last turn of the last layer of the outer portion 17*e*, are held in place.

Such a manufacturing method makes it possible to obtain a trapezoidal winding of which the ends are situated on the small side of the trapezium and of which the angle, denoted a in FIG. 12, of the winding wire 29 at the last turn of the last layer is reduced, thereby making it possible to hold this last turn in place and avoid the risk of the winding wire 29 of the last turn sliding toward the small side of the trapezium, which could lead to a short circuit with the winding wire 29 of the adjacent coil 9.

Figure 13:
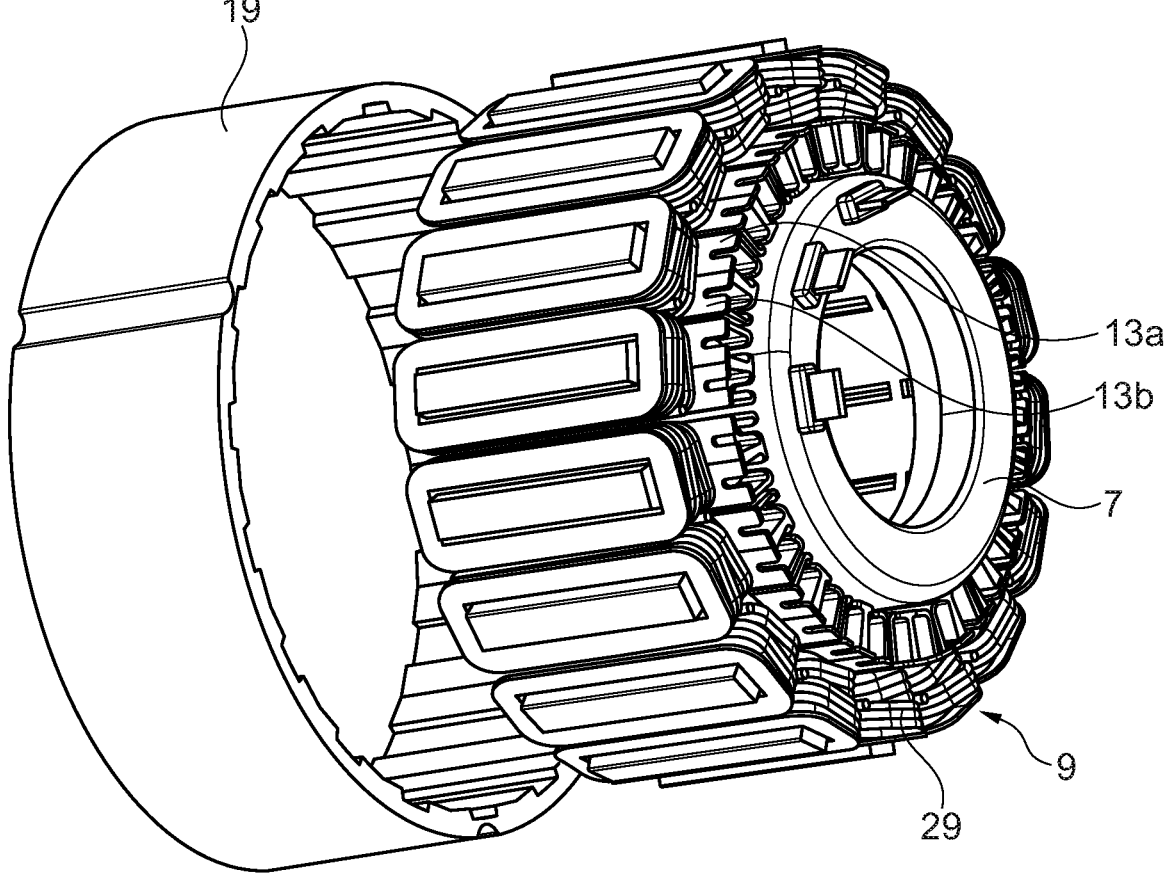
FIG. 13 shows a schematic perspective view of a rotor with separate teeth.

The present invention also relates to a stator 3 comprising a plurality of teeth formed by coils 9 like the coil 9 described above. The coils 9 form separate teeth configured to be positioned on a central module 7, as shown in FIG. 1. FIG. 13 shows an example of a stator 3 with separate teeth. Thus, after the coils 9 have been produced by winding the winding wire 29 on the various bobbins 17, the coils 9 are positioned on the central module 7. The first commutator 13*a* and the second commutator 13*b* of the coils 9 are configured to come into contact with connecting frames 11 configured to connect the ends of the coils 9 in the desired electrical configuration.

Owing to the use of trapezoidal windings, the bulk of the coils 9 is reduced in relation to a stator 3 having the same power and a standard winding. In addition, leaving sites free in the last layer of the inner portion 17*i* and filling these free sites after the turns of the last layer of the outer portion 17*e* have been made makes it possible to hold the turns of the winding in place and thus avoid the last turn of the last layer of the outer portion sliding toward the center of the stator 3, which can lead to a short circuit with the winding wire 29 of an adjacent coil 9. The stator 3 also comprises a yoke 19 configured to be positioned around the coils 9.

The present invention also relates to a method for manufacturing a stator 3 as described above.

Figure 14:
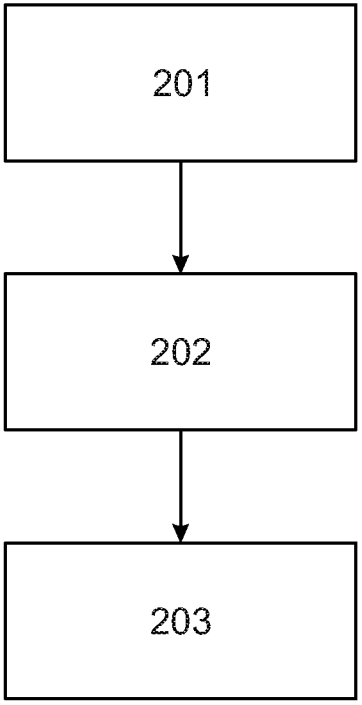
FIG. 14 shows a flow diagram of the steps for manufacturing a stator.

FIG. 14 shows a flow diagram of the steps of the method for manufacturing such a stator 3.

The first step 201 concerns producing the coils 9 as described above. The winding wire 29 is wound, for example, by a robot and it is possible for all the coils 9 to be identical.

The second step 202 concerns connecting the coils 9 forming separate teeth to the central module 7 such that the connecting tabs of the connecting frames 11 are inserted into the first commutator 13*a* and second commutator 13*b* so as to establish the connection between the coils 9 and the connecting frames 11. A connecting tab is configured to come into contact with one end of the winding wire 29 at a first commutator 13*a* or a second commutator 13*b*. The fastening is done, for example, by snap-fastening the coils 9 on the central module 7.

The third step 203 concerns positioning the yoke 19 around the coils 9 forming the separate teeth. The yoke 19 is positioned on the coils 9 by movement in axial translation.

The present invention also relates to an electric motor 1 comprising a stator 3 as described above and a rotor 5 comprising a plurality of poles, for example 10 or 14 poles, configured to interact with the coils of the stator 3 so as to make the rotor 5 rotate.

Therefore, using a stator 3 having separate teeth that are configured to be fastened to a central module 7 comprising the connecting frames establishing the electrical connections between the coils 9 via commutators formed on the bobbin 17 and a trapezoidal winding make it possible to obtain a stator 3 and thus an electric motor 1 that have reduced bulk and can therefore be easily incorporated notably in an electric bicycle. In addition, such a configuration enables a simple and quick method for manufacturing the electric motor.

The invention claimed is:

1. A coil of a stator for an electric motor,
the coil comprising:
  a bobbin which forms a tooth of the stator,
the bobbin comprising:
  a tubular central shaft comprising a plurality of channels formed along its perimeter between a first end of the bobbin that is configured to face toward the center of the stator and a second end of the bobbin that is configured to face toward the outside of the stator,
    wherein the channels are configured to receive a turn of a winding wire wound around the bobbin;
  a first retaining flange situated on the first end of the tubular central shaft,
  a second retaining flange situated on the second end of the central shaft; and
  a winding wire configured to be wound in the form of turns around the bobbin,
wherein the ends of the winding wire are positioned at the first end of the bobbin so as to enable electrical connections toward the center of the stator,
wherein the bobbin comprises a material cutout extending between the first end and the second end of the bobbin, and
wherein the material cutout is configured to receive the winding wire and allow the passage of the winding wire between the first end and the second end of the bobbin.

2. The coil as claimed in claim 1,
wherein the material cutout forms an axial groove extending through the channels.

3. The coil as claimed in claim 1,
wherein the depth of the material cutout is between 0.8 and 1.2 times the diameter of the winding wire.

4. The coil as claimed in claim 1, further comprising a retaining stud disposed at the second end of the bobbin and configured to orient the winding wire coming from the material cutout toward a starting channel for the winding of the winding wire.

5. The coil as claimed in claim 1, further comprising a first commutator configured to receive the first end of the winding wire and a second commutator configured to receive the second end of the winding wire.

6. The coil as claimed in claim 5, wherein the first commutator and the second commutator are formed in one piece with the bobbin.

7. The coil as claimed in claim 1, wherein the channels are inclined in relation to a plane normal to the shaft of the bobbin, wherein the width and the inclination of the channels is determined such that turns of the winding that are disposed in two adjacent channels are adjacent and the successive turns form a helical winding around the central shaft.

8. The coil as claimed in claim 1, wherein the central shaft of the bobbin has a rectangular cross section.

9. The coil as claimed in claim 1, wherein the bobbin forms a separate tooth of the stator that is configured to be positioned on a central module of the stator after the winding has been made.

10. The coil as claimed in claim 1, comprising an inner portion configured to receive a first number of layers of turns and an outer portion configured to receive a second number of layers of turns greater than the first number so as to form a trapezoidal winding, and wherein at least one of the turns of the last layer of the inner portion is made after the turns of the last layer of the outer portion in order to hold the various turns of the winding in place.

11. A stator for an electric motor, comprising a plurality of coils as claimed in claim 1.

12. The stator as claimed in claim 11, wherein the coils are connected in a star configuration.

13. An electric motor comprising a stator as claimed in claim 10, wherein the electric motor is a three-phase brushless motor.

14. A method for manufacturing a coil of a stator for an electric motor, the coil comprising a bobbin on which is formed a plurality of channels configured to receive the turns of a winding wire and disposed along the perimeter of a central shaft of the bobbin between a first end of the central shaft configured to face toward the interior of the stator and a second end of the central shaft configured to face toward the outside of the stator, the bobbin further comprising a material cutout forming a groove for guiding a winding wire between the first end and the second end of the central shaft, the method comprising positioning the winding wire in the guide groove before winding the winding wire around the bobbin.

15. The method for manufacturing a coil as claimed in claim 14, wherein winding the winding wire is terminated at one end of the bobbin and wherein the second end of the winding wire is attached at the first end of the bobbin.

* * * * *